Feb. 12, 1952  S. W. STRICKMAN  2,585,700
METHOD OF MAKING CONDUCTIVE DESIGNS
Filed Feb. 12, 1949
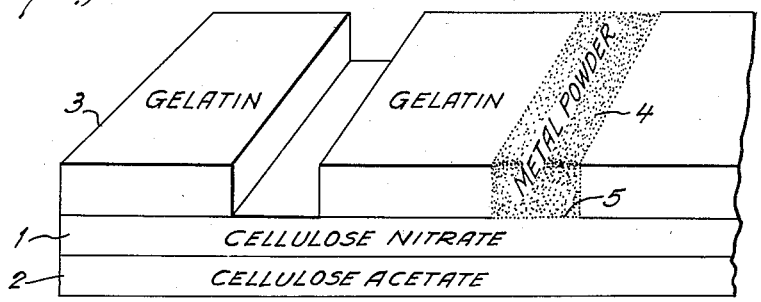
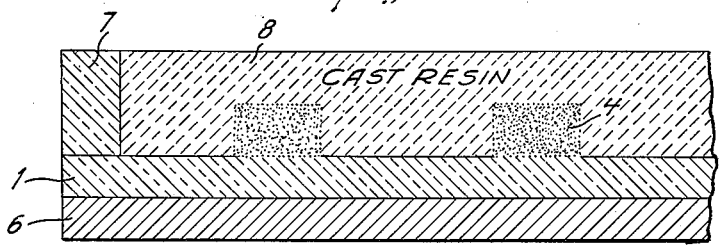
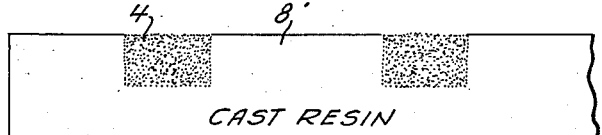
INVENTOR.
SAMUEL W. STRICKMAN
BY
ATTORNEY Patented Feb. 12, 1952

2,585,700

UNITED STATES PATENT OFFICE 2,585,700

METHOD OF MAKING CONDUCTIVE DESIGNS

Samuel W. Strickman, Kew Gardens, N. Y., assignor of one-fourth to Charles E. Bloom, Glen Ridge, N. J., and one-fourth to Harry C. Bierman, New Rochelle, N. Y.

Application February 12, 1949, Serial No. 76,033

7 Claims. (Cl. 204—18)

1

The present invention is directed to the manufacture of conductive designs on non-conducting surfaces, more particularly to the manufacture of articles wherein very fine designs of this nature are desired.

It is among the objects of the present invention to provide conductive articles by a method which includes the production of the conductive design on a surface and the removal therefrom of masking material.

It is also among the objects of the present invention to provide a process whereby the originally produced conductive design may be transferred onto and within a suitable body capable of various industrial uses.

The invention is based upon my co-pending application, Serial No. 53,285, filed October 7, 1948, entitled "Method of Producing Conducting Surfaces." In said application, I have described a process in which conducting particles usually of very fine character, such as .001", for example, are mixed with a volatile organic liquid, said liquid having the property of causing gelling of the surface of a synthetic plastic body. The mixture of volatile liquid and conducting material is agitated to provide a uniform mixture and it is sprayed upon the surface, which becomes gelled by the liquid, and the particles of conducting material are embedded in the surface. Due to the highly volatile character of the liquid, it almost immediately evaporates so that the surface becomes hard and retains the particles firmly anchored therein. In a somewhat longer time, the residual liquid evaporates, restoring the hardness of the initial surface. The conducting particles while being embedded in the surface of the base extend above the same.

The present invention utilizing said process enables one to make exact surface layouts of various characters on non-conducting bases. In accordance with the invention, there may be placed upon a suitable base a desired format, design, pattern, lettering, picture or decorative matter of any type. The base is usually of a synthetic plastic material, one common example of which is a cellulose nitrate film. A design is formed on the film, which may be a photographic film, and the basis of the design may be obtained by exposure to light as in printing from a negative. This is metallized in accordance with the process of the above identified application for patent.

The base containing the design in a metal powder, carbon or graphite, is placed on a suitable surface in mold or die. A synthetic casting resin is then poured over the design. Said resin may be monomer, such as methyl methacrylate; a liquid polymer, such as a styrene resin; a molten material, such as various natural or synthetic resins; or may be a solution of a resin in a volatile solvent. The casting resin is allowed or caused to set by the usual reactions in the hardening of the various types of resin, such as by means of a catalyst, by heat, by evaporation of solvent, or by cooling. Thermosetting resins as well as thermoplastic resins may be used.

After the synthetic casting plastic has been set, the design is firmly anchored therein and is embedded within the surface thereof. The original base may be removed by dissolving the same in a suitable solvent which does not effect the casting material. The design is thus transferred to a base having the properties necessary for practical operation and such design is not readily removed except by abrasion.

In the accompanying drawing constituting a part hereof, and in which like reference characters indicate like parts, Fig. 1 is a fragmentary perspective view greatly enlarged of a photographic film as used in operating the present invention;

Fig. 2 is a fragmentary cross-sectional view of the embodiment shown in Fig. 1 at a later stage of the operation, and Fig. 3 is a fragmentary side elevational view of the transferred design.

There is provided a photographic film having a cellulose nitrate base 1 and a cellulose acetate backing 2 with a light sensitive gelatine layer 3 on the nitrate film. An image is formed on the gelatine by contact printing from a negative or otherwise and the image developed and the exposed portion dissolved off. The remainder of the gelatine layer is then exposed and developed. Such a process is old in the art.

Thereafter a mixture of a metal powder or a carbon-containing powder and a highly volatile organic liquid is sprayed onto the gelatin side of the film, as shown at 4 in Fig. 1, so that the particles embed themselves at 5 in the upper surface of the cellulose nitrate by the gelling action of the liquid. Some powder may adhere to the gelatine but this is of no consequence. Thereafter the remainder of the gelatine surface is dissolved off, leaving the metal powder 4 anchored to film 1 and extending above the surface thereof.

Cellulose acetate 2 is stripped from cellulose nitrate 1 and the film is then placed on a flat surface 6 of any suitable material such as glass, metal or the like. A mask 7 is placed on film 1 around the area into which the synthetic plastic is to be cast. Then a resin 8 is cast into the die or mold thus formed surrounding design 4 and eventually becoming set and firmly holding design 4 within the resin. Then the mask 7 is removed since cast resin does not adhere thereto and film 1 is dissolved by suitable solvents which do not effect the cast resin. The final article has the appearance as shown in Fig. 3.

As a specific example of the operation of the invention, there is formed on the photographic film as shown in Figs. 1 and 2, a suitable image by reversal and in which the gelatine remaining on the film has been developed but not fixed. The purpose of this reversal is to expose the base thermoplastic (cellulose nitrate) by the destruction of the exposed gelatin-silver-halide emulsion. When a halogen ion is present in a mixture of copper ion (as salts)—gelatin plus free halogen ion plus copper ion with the presence of a peroxide in the form of hydrogen peroxide, the reversal bath will completely dissolve the gelatine where the silver halide has been affected by light to liberate free silver and a gelatin-halide complex ion. As a result the image exposed area will disintegrate leaving an exposed thermoplastic base, for the spray to operate on. With this formed one may take the cleared stencil with surrounding gelatin, as a protective area from the spray, and then proceed to coat with metallic silver, making certain that the surface is thoroughly dry before applying the metal powder.

Finely divided silver of about 250 mesh is mixed with anhydrous ethyl acetate in the proportion of 28 grams of silver to 200 cc. of ethyl acetate. The mixture is strongly agitated and is sprayed by the usual spraying equipment such as a Paasche spray gun at a pressure of 60 lbs. per square inch, the silver deposits on the film 1 adhering only to the exposed areas of the film which do not contain gelatine but without adhering to any substantial extent to the gelatine coated areas. The liquid is allowed to evaporate completely, which requires only a few minutes. Care must be taken not to spray onto the film a true wet coating but a fine mist or vapor insufficient to fully wet the film surface.

The film with the adhering silver is then immersed in a photographic reversal bath, such as is well-known, and which may be the following composition disclosed in Patent No. 2,178,338:

| | Cubic centimeters |
|---|---|
| Copper sulfate solution of 7.5 per cent strength | 30 |
| Potassium bromide solution of 0.2 per cent strength | 30 |
| Sulfuric acid of 2.5 per cent strength | 30 |
| Hydrogen peroxide of 3 per cent strength | 45 |

Just before using, there is added to this mixture 350 cc. of 3%-100 volume hydrogen peroxide. The treatment is carried on until the remaining gelatine has been removed, after which the reversed film is washed to remove all traces of the bath used, in order to avoid the inhibiting action of copper ions interfering with the polymerization of monomeric resins cast on the film.

The cellulose acetate base is then removed from the film, and the film with the silver image allowed to soak in water for a substantial length of time, which gives eventually a better adherence of the image to the resin and a more accurate transfer. The film is then thoroughly dried to insure complete transfer and is placed on a flat plate glass sheet with the silver side up. The film is flattened and smoothed and the edges wetted with a stripping film cement to hold the film in position. The assembly is allowed to thoroughly dry and there is placed on the film around the periphery thereof a masking material of the desired thickness, which may be a polyvinyl alcohol.

The resin, which is preferably of the alkyd type, is an unsaturated polyester made by reacting any one of the following in these groups by taking any one of these acids—fumaric, maleic, itaconic, and similar polybasic acids, reacted with any one of polyhydric alcohols, as follows: ethylene glycol, diethylene glycol, propylene glycol and others, further modified with monobasic acids, such as acetic acid, butyric acid or propionic acid, etc. Or, we may use one of the monohydric alcohols in place of the monobasic, such as methyl, ethyl, butyl or propyl alcohol. These may be copolymerized with monomeric styrene or monomeric methyl methacrylate.

The casting material may consist of the following mixture:

| | |
|---|---|
| Glyceryl maleate (modified) parts by weight | 100 |
| Styrene (monomer) parts | 40 |
| Benzoyl peroxide do | 1.4 |

The benzoyl peroxide acts as a catalyst in the reaction. The resin may be one manufactured by Marco Chemical Co. and identified as "MR-21."

There may be added to this mixture other materials such as fillers to increase the heat resistance, the physical strength thereof or the insulating properties, such as powdered mica, asbestos, titanium dioxide, iron black, and the like in any suitable proportions. If desired, an accelerator of polymerization may be added to the casting material just prior to pouring the same into a mold formed by the film and masking material.

Then a glass plate is placed on the top of the casting material and the assembly is placed in an oven at 60° C. until gelation of the casting material occurs. Then the temperature is raised to 120° C. for about 10 minutes. If an accelerator is used, heat need not apply, and polymerization takes place without heating.

A complete transfer of the silver image takes place, it becoming embodied in the hardened cast material which appears to seize the particles without distorting the image. The resin is cooled to room temperature, the plates are removed and the masking material is stripped off. The solid sheet with the film adhering thereto is thoroughly washed with acetone and rubbed lightly until the film is removed and the silver is completely exposed.

If a higher conductivity is desired, the article may now be subjected to plating in the usual manner. For instance, it may be placed in a plating bath having the following composition:

| | |
|---|---|
| Silver cyanide oz | 4 |
| Potassium cyanide oz | 5.5 |
| Potassium carbonate oz | 6 |

Water to make one gallon.

Silver anodes are used as the source of plating metal and the operation is conducted at ½ volt D. C. In order to obtain a resistance of less than 1 ohm, the plating time is about ½ to one minute and the smoothness of the surface of the casting resin is not affected.

It is sometimes desirable in order to obtain a smoother surface of the conductive pattern to subject the same to a hot stamping operation. This may be accomplished by heating the stamp to about 400° F., bringing it quickly down on the silver pattern so as to force it further into the cast resin and the stamp quickly removed to avoid destortion of the article. The hot stamping may take place either before or after the electroplating.

Although the invention has been described setting forth a single specific embodiment thereof, the invention is not limited to the details set forth in such example. For instance, the polyester resin specifically described is not the only one which may be used and such resins as the vinyl compounds, for instance, a copolymer of 85% vinyl acetate and 15% vinyl chloride is equally suitable. Various other resins of thermoplastic type, such as styrene, alkyl acrylates, and various copolymers may be used. Also applicable are casting resins of the thermosetting type, such as the phenol formaldehyde resins and others. The casting materials may be monomers or polymers and may be solutions of such polymers in volatile solvents.

The conductive material used may be other metals, such as copper, zinc and others and may be non-metallic, such as graphite, carbon and the like. The solvents used for removal of the cellulose nitrate may be any of the solvents for such materials provided that they do not also dissolve the cast resin. Among such solvents are mesityl oxide, butyl acetate and the like.

The degree of polymerization of the casting resin may be readily controlled for various purposes. In the case of a higher polymer, some shrinkage takes place but the image becomes sharpened; it projects above the surface of the resin and allows soldering of lead wires and the like thereto more perfectly than heretofore. If a low polymer is formed, optical flatness is approached. Other advantages are obtained including surface smoothness and the hot stamping may be omitted.

The invention is applicable to many uses and has been applied to printed circuits where it has found substantial applications. Such devices as commutators, resistors and the like requiring fine conductive patterns or of complicated designs are readily produced.

I claim:

1. A method of forming conductive designs which comprises providing a photographic film of a substance capable of being gelled by volatile organic liquids with an exposed and developed image in gelatine, removing the gelatine from said exposed image to expose said film at a lower level than the gelatin, spraying a mixture of finely divided conducting particles and a readily volatile organic liquid capable of gelling the surface of said film onto the gelatine side to cause gelling of said film and penetration of said particles into the surface thereof, and evaporating said liquid, whereby said particles adhere to said film.

2. A method of forming conductive designs which comprises providing a photographic film of a substance capable of being gelled by volatile organic liquids with an exposed and developed image in gelatine, removing the gelatine from said exposed image to expose said film at a lower level than the gelatine, spraying a mixture of finely divided conducting particles and a readily volatile organic liquid capable of gelling the surface of said film onto the gelatine side to cause gelling of said film and penetration of said particles into the surface thereof, and evaporating said liquid, whereby said particles adhere to said film, then removing said gelatine.

3. A method of forming conductive designs which comprises providing a photographic film of a substance capable of being gelled by volatile organic liquids with an exposed and developed image in gelatine, removing the gelatine from said exposed image to expose said film at a lower level than the gelatine, spraying a mixture of finely divided conducting particles and a readily volatile organic liquid capable of gelling the surface of said film onto the gelatine side, to cause gelling of said film and penetration of said particles into the surface thereof, and evaporating said liquid, whereby said particles adhere to said film, then removing said gelatine, thereafter applying to said surface a synthetic organic substance capable of being hardened in situ and hardening said substance, whereby said particles become embedded in said substance.

4. A method of forming conductive designs which comprises providing a photographic film of a substance capable of being gelled by volatile organic liquids with an exposed and developed image in gelatine, removing the gelatine from said exposed image to expose said film at a lower level than the gelatine, spraying a mixture of finely divided conducting particles and a readily volatile organic liquid capable of gelling the surface of said film onto the gelatine side to cause gelling of said film and penetration of said particles into the surface thereof, and evaporating said liquid, whereby said particles adhere to said film, then removing said gelatine, thereafter applying to said surface a synthetic organic substance capable of being hardened in situ and hardening said substance, whereby said particles become embedded in said substance, stripping said film from said hardened substance.

5. A method of forming conductive designs which comprises providing a photographic film of a substance capable of being gelled by volatile organic liquids with an exposed and developed image in gelatine, removing the gelatine from said exposed image to expose said film at a lower level than the gelatine, spraying a mixture of finely divided conducting particles and a readily volatile organic liquid capable of gelling the surface of said film onto the gelatine side to cause gelling of said film and penetration of said particles into the surface thereof, and evaporating said liquid, whereby said particles adhere to said film, then removing said gelatine, thereafter applying to said surface a synthetic organic substance capable of being hardened in situ and hardening said substance, whereby said particles become embedded in said substance, stripping said film from said hardened substance, and electroplating metal on the conductive pattern of said particles.

6. A method of forming conductive designs which comprises providing a photographic film of a substance capable of being gelled by volatile organic liquids with an exposed and developed image in gelatine, removing the gelatine from said exposed image to expose said film at a lower level than the gelatine, spraying a mixture of finely divided conducting particles and a readily volatile organic liquid capable of gelling the surface of said film onto the gelatine side to cause gelling of said film and penetration of said particles into the surface thereof, and evaporating said liquid, whereby said particles adhere to said film, then removing said gelatine, thereafter applying to said surface a synthetic organic substance capable of being hardened in situ and hardening said substance, whereby said particles become embedded in said substance, stripping said film from said hardened substance, and hot stamping said particles into said substance.

7. A method of forming conductive designs which comprises providing a photographic film of a substance capable of being gelled by volatile organic liquids with an exposed and developed image in gelatine, removing the gelatine from said exposed image to expose said film at a lower level than the gelatine, spraying a mixture of finely divided conducting particles and a readily volatile organic liquid capable of gelling the surface of said film onto the gelatine side to cause gelling of said film and penetration of said particles into the surface thereof, and evaporating said liquid, whereby said particles adhere to said film, then removing said gelatine, masking said film, thereafter applying to said surface a synthetic organic substance capable of being hardened in situ and hardening said substance, whereby said particles become embedded in said substance.

SAMUEL W. STRICKMAN.

REFERENCES CITED

The following references are of record in the file of this patent:

UNITED STATES PATENTS

| Number | Name | Date |
|---|---|---|
| 474,888 | Wellstood | May 17, 1892 |
| 1,622,775 | Fink | Mar. 29, 1927 |
| 1,888,344 | Bon | Nov. 22, 1932 |
| 2,001,725 | Harris | May 21, 1935 |
| 2,066,511 | Arlt | Jan. 5, 1937 |
| 2,244,187 | Cochran | June 3, 1941 |
| 2,447,541 | Sabee | Aug. 24, 1948 |
| 2,506,604 | Lokker | May 9, 1950 |